United States Patent
Chen

(10) Patent No.: US 10,193,794 B2
(45) Date of Patent: Jan. 29, 2019

(54) MULTIPARTY CALL METHOD AND APPARATUS

(71) Applicant: Huawei Technologies Co., Ltd., Shenzhen (CN)

(72) Inventor: Changzhou Chen, Nanjing (CN)

(73) Assignee: HUAWEI TECHNOLOGIES CO., LTD., Shenzhen (CN)

( * ) Notice: Subject to any disclaimer, the term of this patent is extended or adjusted under 35 U.S.C. 154(b) by 275 days.

(21) Appl. No.: 15/151,064

(22) Filed: May 10, 2016

(65) Prior Publication Data

US 2016/0254989 A1     Sep. 1, 2016

Related U.S. Application Data

(63) Continuation of application No. PCT/CN2013/086961, filed on Nov. 12, 2013.

(51) Int. Cl.
*H04L 1/00* (2006.01)
*H04L 12/761* (2013.01)
*H04L 29/06* (2006.01)
*H04L 12/18* (2006.01)
*H04M 3/00* (2006.01)
(Continued)

(52) U.S. Cl.
CPC .............. *H04L 45/16* (2013.01); *H04L 12/18* (2013.01); *H04L 12/189* (2013.01); *H04L 12/1818* (2013.01); *H04L 12/1886* (2013.01); *H04L 29/06* (2013.01); *H04L 61/2517* (2013.01); *H04L 65/00* (2013.01); *H04L 65/403* (2013.01); *H04M 3/00* (2013.01); *H04M 3/56* (2013.01); *H04M 7/006* (2013.01); *H04M 7/0075* (2013.01)

(58) Field of Classification Search
CPC ................. H04L 12/56; H04L 12/1813; H04L 29/06414; H04L 43/00; H04L 43/50; H04M 2203/2088; H04M 3/56; H04M 3/561; H04M 3/567; H04M 2203/20; H04M 2203/35; H04B 17/00; H04B 3/46; H04W 24/00
USPC ................................ 370/389, 252, 259, 260
See application file for complete search history.

(56) References Cited

U.S. PATENT DOCUMENTS

| 2011/0267420 | A1 | 11/2011 | Tanaka |
| 2012/0105571 | A1 | 5/2012 | Li et al. |
| 2013/0222526 | A1* | 8/2013 | Miyazawa ............. H04N 7/155 348/14.08 |

FOREIGN PATENT DOCUMENTS

| CN | 101610385 A | 12/2009 |
| CN | 101662699 A | 3/2010 |

(Continued)

OTHER PUBLICATIONS

Partial English Translation and Abstract of Chinese Patent Application No. CN102348097, May 20, 2016, 5 pages.
(Continued)

*Primary Examiner* — Dady Chery
(74) *Attorney, Agent, or Firm* — Conley Rose, P.C.

(57) ABSTRACT

A multiparty call method and an apparatus. A transmit end acquires communications data to be transmitted to at least two receive ends and identifiers of the at least two receive ends. The transmit end sends the communications data and the identifiers of the at least two receive ends to a network side device. The network side device forwards the communications data to the receive ends that correspond to the identifiers of the at least two receive ends.

16 Claims, 4 Drawing Sheets

A network side device receives communications data to be transmitted to at least two receive ends and identifiers of the at least two receive ends that are sent by a transmit end — S201

The network side device forwards the communications data to the at least two receive ends according to the identifiers of the at least two receive ends — S202

(51) Int. Cl.
　　　*H04L 29/12*　　(2006.01)
　　　*H04M 7/00*　　(2006.01)
　　　*H04M 3/56*　　(2006.01)

(56) References Cited

FOREIGN PATENT DOCUMENTS

| CN | 102348097 A | 2/2012 |
|---|---|---|
| CN | 102970512 A | 3/2013 |
| CN | 103298143 A | 9/2013 |
| CN | 103369158 A | 10/2013 |
| CN | 103379232 A | 10/2013 |
| EP | 2224667 A1 | 9/2010 |

OTHER PUBLICATIONS

Partial English Translation and Abstract of Chinese Patent Application No. CN10290512, May 20, 2016, 4 pages.

"3rd Generation Partnership Project; Technical Specification Group Core Network and Terminals; Mobile radio Interface Layer 3 specification; Core network protocols; Stage 3 (Release 12)," 3GPP TS 24.008, V12.3.0, Technical Specification, Sep. 2013, 683 pages.

Foreign Communication From a Counterpart Application, European Application No. 13897420.9, Extended European Search Report dated Jul. 21, 2016, 11 pages.

Foreign Communication From a Counterpart Application, Chinese Application No. 201380005704.1, Chinese Office Action dated Feb. 26, 2016, 5 pages.

Foreign Communication From a Counterpart Application, PCT Application No. PCT/CN2013/086961, English Translation of International Search Report dated Aug. 20, 2014, 2 pages.

Foreign Communication From a Counterpart Application, PCT Application No. PCT/CN2013/086961, English Translation of Written Opinion dated Aug. 20, 2014, 6 pages.

Foreign Communication From a Counterpart Application, Chinese Application No. 201380005704.1, Chinese Office Action dated Apr. 1, 2017, 7 pages.

\* cited by examiner

MULTIPARTY CALL METHOD AND APPARATUS

CROSS-REFERENCE TO RELATED APPLICATIONS

This application is a continuation of International Application No. PCT/CN2013/086961, filed on Nov. 12, 2013, which is hereby incorporated by reference in its entirety

TECHNICAL FIELD

The present disclosure relates to the field of communications, and in particular, to a multiparty call method and an apparatus.

BACKGROUND

With rapid development of communications technologies, there are increasing functions and call making manners of a mobile terminal. Multiparty calls greatly facilitate our personal and work lives. The multiparty call, that is, an online multiparty call implemented by various means, can implement multiparty, remote, and real-time online communication in a manner such as a conference call or a video conference.

In the prior art, terminals that participate in a multiparty call need to send same data to other terminals that participate in the call. However, because each terminal that participates in the multiparty call needs to send the same data to the other terminals that participate in the call, a dramatic increase in traffic is caused, and a network delay increases.

SUMMARY

Embodiments of the present disclosure provide a multiparty call method and an apparatus, which can save an air interface resource and reduce a network delay.

To achieve the foregoing objectives, the following technical solutions are adopted in the embodiments of the present disclosure.

According to a first aspect, an embodiment of the present disclosure provides a multiparty call method, applied in a process in which a transmit end makes a multiparty call with at least two receive ends, where the method includes acquiring, by the transmit end, communications data to be transmitted to the at least two receive ends and identifiers of the at least two receive ends, and sending, by the transmit end, the communications data and the identifiers of the at least two receive ends to a network side device such that the network side device forwards the communications data to the receive ends that correspond to the identifiers of the at least two receive ends.

In a first possible implementation manner of the first aspect, before the sending, by the transmit end, the communications data and the identifiers of the at least two receive ends to a network side device, the method further includes sending, by the transmit end, a multiparty call request to the network side device, if the network side device supports the multiparty call, receiving, by the transmit end, a first response message that corresponds to the multiparty call request and that is sent by the network side device, where the first response message is used to indicate to the transmit end that the network side device supports the multiparty call and that the network side device already acquires an identifier of the transmit end and the identifiers of the at least two receive ends, and sending, by the transmit end, a link establishment request that includes the identifiers of the at least two receive ends to the network side device such that the network side device establishes a link connection separately to the at least two receive ends.

With reference to the first aspect or the first possible implementation manner of the first aspect, in a second possible implementation manner of the first aspect, the identifier of the receive end includes at least an internet protocol (IP) address and a port number of the receive end.

According to a second aspect, an embodiment of the present disclosure further provides a multiparty call method, applied in a process in which a transmit end makes a multiparty call with at least two receive ends, where the method includes receiving, by a network side device, communications data to be transmitted to the at least two receive ends and identifiers of the at least two receive ends that are sent by the transmit end, and forwarding, by the network side device, the communications data to the at least two receive ends according to the identifiers of the at least two receive ends.

In a first possible implementation manner of the second aspect, before the receiving, by a network side device, communications data to be transmitted to the at least two receive ends and identifiers of the at least two receive ends that are sent by the transmit end, the method further includes receiving, by the network side device, a multiparty call request sent by the transmit end, if the network side device supports the multiparty call, sending, by the network side device, a first response message that corresponds to the multiparty call request to the transmit end, where the first response message is used to indicate to the transmit end that the network side device supports the multiparty call and that the network side device already acquires an identifier of the transmit end and the identifiers of the at least two receive ends, receiving, by the network side device, a link establishment request that includes the identifiers of the at least two receive ends and is sent by the transmit end, and establishing, by the network side device, a link connection separately to the at least two receive ends according to the link establishment request.

With reference to the second aspect or the first possible implementation manner of the second aspect, in a second possible implementation manner of the second aspect, the identifier of the receive end includes at least an IP address and a port number of the receive end.

According to a third aspect, an embodiment of the present disclosure provides user equipment configured to make a multiparty call with at least two receive ends, and including an acquiring unit configured to acquire communications data to be transmitted to the at least two receive ends and identifiers of the at least two receive ends, and a first sending unit configured to send the communications data and the identifiers of the at least two receive ends that are acquired by the acquiring unit to a network side device such that the network side device forwards the communications data to the receive ends that correspond to the identifiers of the at least two receive ends.

In a first possible implementation manner of the third aspect, before sending the communications data and the identifiers of the at least two receive ends to the network side device, the first sending unit is further configured to send a multiparty call request to the network side device, and is configured to send a link establishment request that includes the identifiers of the at least two receive ends to the network side device such that the network side device establishes a link connection separately to the at least two receive ends, and the user equipment further includes a first receiving unit, where the first receiving unit is configured to, if the network side device supports the multiparty call, receive a first response message that corresponds to the multiparty call request and that is sent by the network side device, where the first response message is used to indicate to the user equipment that the network side device supports the multiparty call and that the network side device already acquires an identifier of the user equipment and the identifiers of the at least two receive ends.

With reference to the third aspect or the first possible implementation manner of the third aspect, in a second possible implementation manner of the third aspect, the identifier of the receive end includes at least an IP address and a port number of the receive end.

According to a fourth aspect, an embodiment of the present disclosure provides a network side device configured to implement a multiparty call between a transmit end and at least two receive ends, and including a second receiving unit configured to receive communications data to be transmitted to the at least two receive ends and identifiers of the at least two receive ends that are sent by the transmit end, and a second sending unit configured to forward the communications data to the at least two receive ends according to the identifiers of the at least two receive ends that are received by the second receiving unit.

In a first possible implementation manner of the fourth aspect, before receiving the communications data to be transmitted to the at least two receive ends and the identifiers of the at least two receive ends that are sent by the transmit end, the second receiving unit is further configured to receive a multiparty call request sent by the transmit end, and is configured to receive a link establishment request that includes the identifiers of the at least two receive ends and is sent by the transmit end, the second sending unit is further configured to, if the network side device supports the multiparty call, send a first response message that corresponds to the multiparty call request to the transmit end, where the first response message is used to indicate to the transmit end that the network side device supports the multiparty call and that the network side device already acquires, or successfully acquired, an identifier of the transmit end and the identifiers of the at least two receive ends, and the network side device further includes a processing unit, where the processing unit is configured to establish a link connection separately to the at least two receive ends according to the link establishment request received by the second receiving unit.

With reference to the fourth aspect or the first possible implementation manner of the fourth aspect, in a second possible implementation manner of the fourth aspect, the identifier of the receive end includes at least an IP address and a port number of the receive end.

The embodiments of the present disclosure provide a multiparty call method and an apparatus, where a transmit end acquires communications data to be transmitted to at least two receive ends and identifiers of the at least two receive ends, and then, the transmit end sends the communications data and the identifiers of the at least two receive ends to a network side device such that the network side device forwards the communications data to the receive ends that correspond to the identifiers of the at least two receive ends. Using the solutions, the transmit end sends the communications data and the identifiers of the at least two receive ends to the network side device such that the network side device forwards the communications data to the receive ends that correspond to the identifiers of the at least two receive ends, which completes a multiparty call between the transmit end and the at least two receive ends, resolves a problem that the transmit end needs to send same communications data to the receive ends, and ensures that only one piece of data is transferred over an air interface, thereby saving an air interface resource, and reducing a network delay.

BRIEF DESCRIPTION OF DRAWINGS

To describe the technical solutions in the embodiments of the present disclosure more clearly, the following briefly introduces the accompanying drawings required for describing the embodiments. Apparently, the accompanying drawings in the following description show merely some embodiments of the present disclosure, and a person of ordinary skill in the art may still derive other drawings from these accompanying drawings without creative efforts.

DESCRIPTION OF EMBODIMENTS

Figure 1:
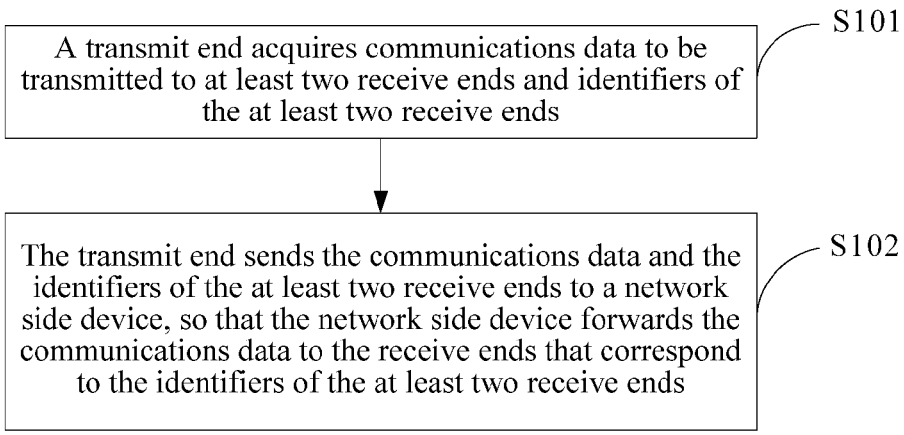
FIG. 1 is schematic flowchart 1 of a multiparty call method according to an embodiment of the present disclosure.

The following clearly and describes the technical solutions in the embodiments of the present disclosure with reference to the accompanying drawings in the embodiments of the present disclosure. Apparently, the described embodiments are merely some but not all of the embodiments of the present disclosure. All other embodiments obtained by a person of ordinary skill in the art based on the embodiments of the present disclosure without creative efforts shall fall within the protection scope of the present disclosure.

Technologies described in the embodiments of the present disclosure may be applied to communications systems in which shared data exists and a network path has a bandwidth bottleneck, such as a Global System for Mobile Communications (GSM), a Code Division Multiple Access (CDMA) system, a Time Division Multiple Access (TDMA) system, a Wideband Code Division Multiple Access (WCDMA) system, a Frequency Division Multiple Access (FDMA) system, an Orthogonal Frequency-Division Multiple Access (OFDMA) system, a single-carrier FDMA (SC-FDMA) system, a general packet radio service (GPRS) system, a Long Term Evolution (LTE) system, and another communications system.

User equipment is a wireless terminal. The wireless terminal may be a device that provides a user with voice and/or data connectivity, a handheld device with a wireless connection function, or another processing device connected to a radio modem. The wireless terminal may communicate with one or more core networks using a radio access network (RAN). The wireless terminal may be a mobile terminal such as a mobile phone (or referred to as a "cellular" phone) or a computer with a mobile terminal, and for example, may be a portable, pocket-sized, handheld, computer built-in, or in-vehicle mobile apparatus, which exchanges voice and/or data with the radio access network. The wireless terminal may be, for example, a device such as a personal communications service (PCS) phone set, a cordless telephone set, a Session Initiation Protocol (SIP) phone set, a wireless local loop (WLL) station, or a personal digital assistant (PDA). The wireless terminal may be also referred to as a system, a subscriber unit, a subscriber station, a mobile station, a mobile equipment (Mobile), a remote station, an access point, a remote terminal, an access terminal, a user terminal, a user agent, a user equipment, or user device.

An air interface refers to a radio interface, and is also referred to as a Um interface, which is an interface between a mobile station (MS) and a base transceiver station (BTS). Using the interface, the MS completes communication with a network side, and completes various functions such as packet data transfer, mobility management, session management, and radio resource management.

An air interface resource refers to a high frequency resource transmitted between the user equipment and a network side device.

Embodiment 1

A network side device described in this embodiment of the present disclosure may be a wireless router, for example, Wi-Fi router, or may be a network device such as a network device, gateway, or mobility management entity based on a 3G mobile communications technology. A transmit end and a receive end that are described in this embodiment of the present disclosure may be user terminals, or may be other terminals that can be used for information transmission, which is not limited in this embodiment of the present disclosure.

This embodiment of the present disclosure provides a multiparty call method, applied in a process in which a transmit end makes a multiparty call with at least two receive ends. As shown in FIG. 1, the method includes the following steps:

S101: The transmit end acquires communications data to be transmitted to the at least two receive ends and identifiers of the at least two receive ends.

A multiparty call refers to an online multiparty call implemented by various means, which can implement multiparty, remote, real-time online communication and is mainly applied to a business communications, where a typical implementation manner is, for example, a conference call.

It should be noted that, the multiparty call method described in this embodiment of the present disclosure may be a multiparty voice call method, or may be a multiparty video call method, which is not limited in the present disclosure.

For example, when the transmit end makes a multiparty call with the at least two receive ends, the transmit end first acquires the communications data to be transmitted to the at least two receive ends and the identifiers of the at least two receive ends in order to transmit the to-be-transmitted data to the at least two receive ends.

The transmit end acquires only one piece of communications data to be transmitted to the at least two receive ends, the identifier of the receive end is used to indicate a specific position of the receive end, and each receive end has a unique identifier. The identifier of the receive end may include, for example, an IP address and a port number of the receive end.

For example, a multiparty voice call is made among mobile phone users A, B, and C. When the user A wants to send voice data to the users B and C, a mobile phone of the user A needs to first acquire the to-be-sent voice data, an identifier of a mobile phone of the user B, and an identifier of a mobile phone of the user C.

S102: The transmit end sends the communications data and the identifiers of the at least two receive ends to a network side device such that the network side device forwards the communications data to the receive ends that correspond to the identifiers of the at least two receive ends.

In the multiparty call method provided in this embodiment of the present disclosure, the network side device is introduced between the transmit end and the at least two receive ends that participate in the multiparty call, and a wireless connection is established between the network side device and the transmit end.

Optionally, the wireless connection between the network side device and the transmit end may be implemented using a 3G mobile communications technology, or may be implemented using a wireless local area network, for example, Wi-Fi, which is not limited in this embodiment of the present disclosure.

For example, the transmit end needs to collect only one piece of communications data and send the communications data to the network side device and sends the identifiers of the at least two receive ends to the network side device. Then the network side device forwards the communications data to the at least two receive ends according to the identifiers of the receive ends.

Further, before sending the communications data to the receive ends, the transmit end needs to send a multiparty call request to the network side device to detect whether the network side device supports the multiparty call. If the network side device supports the multiparty call request, steps described in this embodiment of the present disclosure can be implemented.

Exemplarily, the transmit end in this embodiment of the present disclosure may be an electronic device that establishes a wireless connection to the network side device, for example, an electronic device such as a personal computer, an iPad, or a smart phone. The network side device may be a wireless router or a network side device based on a 3G mobile communications technology. It should be noted that, the identifier of the receive end may also be another special identifier, where the special identifier can be identified by the network side device.

This embodiment of the present disclosure provides a multiparty call method, where a transmit end acquires communications data to be transmitted to at least two receive ends and identifiers of the at least two receive ends, and then, the transmit end sends the communications data and the identifiers of the at least two receive ends to a network side device such that the network side device forwards the communications data to the receive ends that correspond to the identifiers of the at least two receive ends. Using the solution, the transmit end sends the communications data and the identifiers of the at least two receive ends to the network side device such that the network side device forwards the communications data to the receive ends that correspond to the identifiers of the at least two receive ends, which completes a multiparty call between the transmit end and the at least two receive ends, resolves a problem that the transmit end needs to send same communications data to the receive ends, and ensures that only one piece of data is transferred over an air interface, thereby saving an air interface resource, and reducing a network delay.

Embodiment 2

A network side device described in this embodiment of the present disclosure may be a wireless router, or may be a network device such as a network device, gateway, or mobility management entity based on a 3G mobile communications technology. A transmit end and a receive end that are described in this embodiment of the present disclosure may be user terminals, or may be other terminals that can be used for information transmission, which is not limited in this embodiment of the present disclosure.

Figure 2:
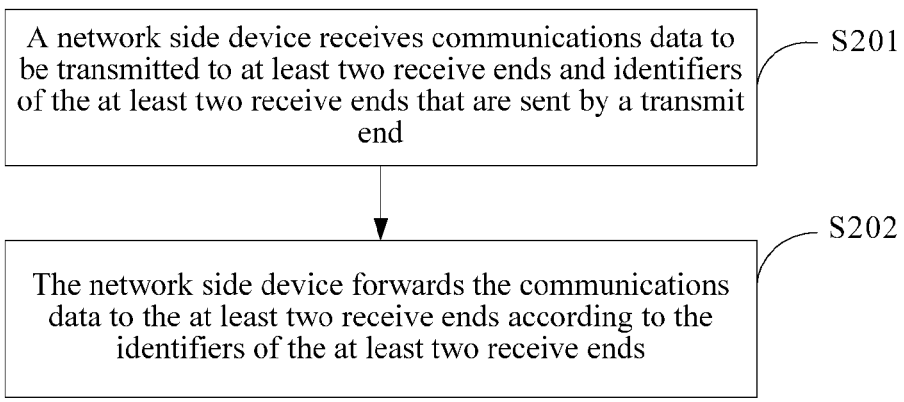
FIG. 2 is schematic flowchart 2 of a multiparty call method according to an embodiment of the present disclosure.

This embodiment of the present disclosure provides a multiparty call method, applied in a process in which a transmit end makes a multiparty call with at least two receive ends. As shown in FIG. 2, the method includes the following steps:

S201: A network side device receives communications data to be transmitted to the at least two receive ends and identifiers of the at least two receive ends that are sent by a transmit end.

In the multiparty call method provided in this embodiment of the present disclosure, the network side device is introduced between the transmit end and the at least two receive ends that participate in the multiparty call, and a wireless connection is established between the network side device and the transmit end.

Optionally, the wireless connection between the network side device and the transmit end may be implemented using a 3G mobile communications technology, or may be implemented using a wireless local area network, for example, Wi-Fi, which is not limited in this embodiment of the present disclosure.

It should be noted that, the multiparty call method described in this embodiment of the present disclosure may be a multiparty voice call method, or may be a multiparty video call method, which is not limited in the present disclosure.

For example, when the transmit end makes the multiparty call with the at least two receive ends, the network side device first receives the communications data to be transmitted to the at least two receive ends and the identifiers of the at least two receive ends that are sent by the transmit end, to forward the communications data according to the identifiers of the at least two receive ends.

The network side device receives only one piece of communications data sent by the transmit end, the identifier of the receive end is used to indicate a specific position of the receive end, and each receive end has a unique identifier. The identifier of the receive end may include, for example, an IP address and a port number of the receive end. After receiving the identifiers of the at least two receive ends from the transmit end, the network side device acquires, from the identifiers, specific information of the receive ends.

Further, before the network side device receives the communications data to be transmitted to the at least two receive ends and the identifiers of the at least two receive ends that are sent by the transmit end, the network side device needs to determine whether the network side device supports a multiparty call request. If the network side device supports the multiparty call request, steps described in this embodiment of the present disclosure can be implemented.

Exemplarily, the network side device is a Wi-Fi router, a multiparty voice call is made among mobile phone users A, B, and C, and the user A already establishes a wireless connection to the Wi-Fi router. When the user A wants to send voice data to the users B and C, the Wi-Fi router first acquires the to-be-sent voice data, an identifier of a mobile phone of the user B, and an identifier of a mobile phone of the user C.

S202: The network side device forwards the communications data to the at least two receive ends according to the identifiers of the at least two receive ends.

After receiving the communications data to be transmitted to the at least two receive ends and the identifiers of the at least two receive ends, that are sent by the transmit end, the network side device forwards the to-be-transmitted data to the receive ends.

For example, the network side device forwards the communications data to the at least two receive ends according to the identifiers of the at least two receive ends, to complete data transmission in the multiparty call between the transmit end and the at least two receive ends.

The identifier of the receive end may be an IP address and a port number of the receive end, or may be another special identifier, where the special identifier can be identified by the network side device.

This embodiment of the present disclosure provides a multiparty call method. A network side device receives communications data to be transmitted to at least two receive ends and identifiers of the at least two receive ends that are sent by a transmit end, and then, the network side device forwards the communications data to the at least two receive ends according to the identifiers of the at least two receive ends. Using the solution, the transmit end sends the communications data and the identifiers of the at least two receive ends to the network side device such that the network side device forwards the communications data to the receive ends that correspond to the identifiers of the at least two receive ends, which completes a multiparty call between the transmit end and the at least two receive ends, resolves a problem that the transmit end needs to send same communications data to the receive ends, and ensures that only one piece of data is transferred over an air interface, thereby saving an air interface resource, and reducing a network delay.

Embodiment 3

A network side device described in this embodiment of the present disclosure may be a wireless router, or may be a network device such as a network device, gateway, or mobility management entity based on a 3G mobile communications technology. A transmit end and a receive end that are described in this embodiment of the present disclosure may be user terminals, or may be other terminals that can be used for information transmission, which is not limited in this embodiment of the present disclosure.

Figure 3:
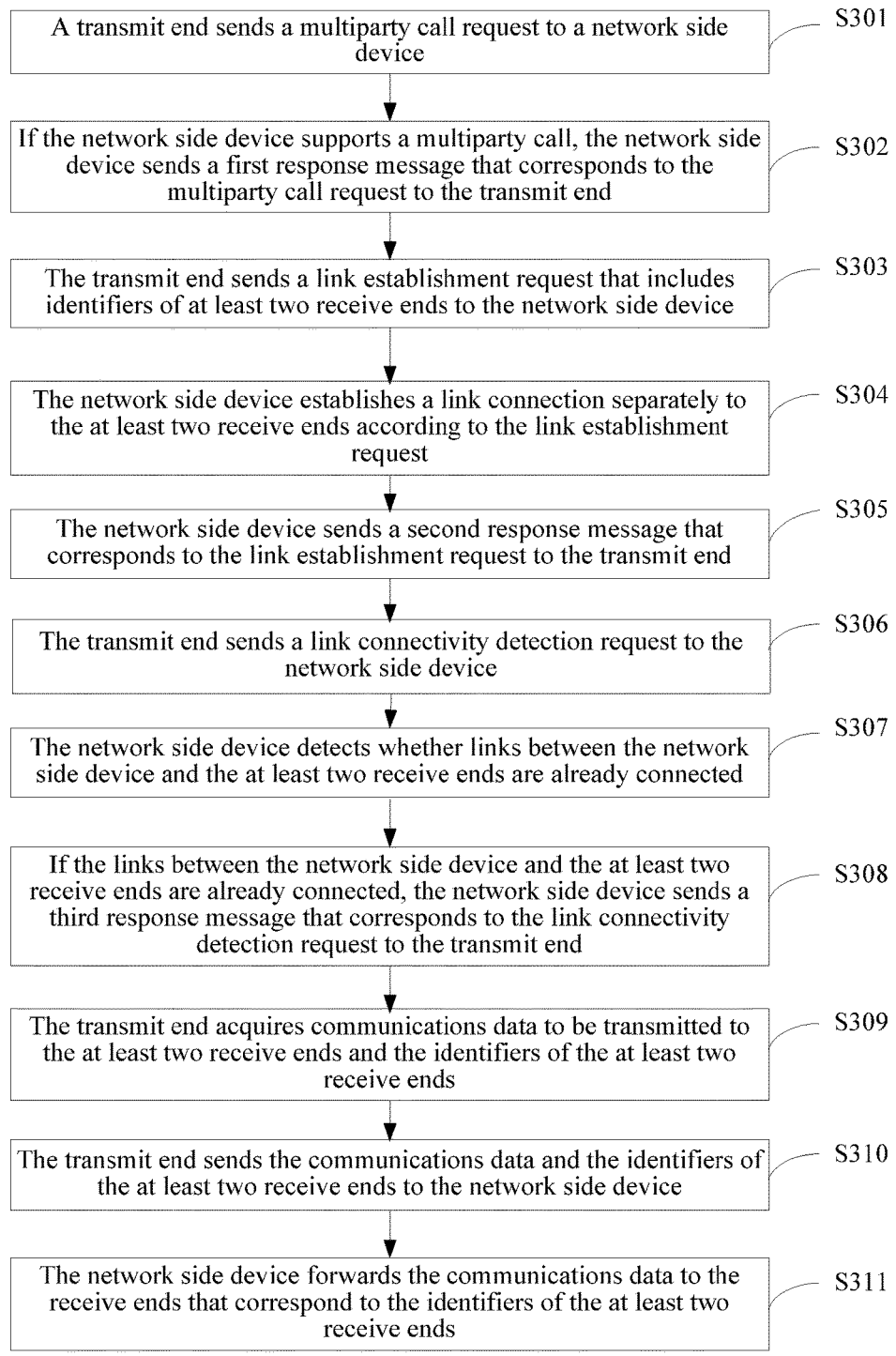
FIG. 3 is schematic flowchart 3 of a multiparty call method according to an embodiment of the present disclosure.

This embodiment of the present disclosure provides a multiparty call method, applied in a process in which a transmit end makes a multiparty call with at least two receive ends. As shown in FIG. 3, the method includes the following steps:

S301: The transmit end sends a multiparty call request to a network side device.

S302: If the network side device supports the multiparty call, the network side device sends a first response message that corresponds to the multiparty call request to the transmit end.

S303: The transmit end sends a link establishment request that includes identifiers of the at least two receive ends to the network side device.

S304: The network side device establishes a link connection separately to the at least two receive ends according to the link establishment request.

S305: The network side device sends a second response message that corresponds to the link establishment request to the transmit end.

S306: The transmit end sends a link connectivity detection request to the network side device.

S307: The network side device detects whether links between the network side device and the at least two receive ends are already connected.

S308: If the links between the network side device and the at least two receive ends are already connected, the network side device sends a third response message that corresponds to the link connectivity detection request to the transmit end.

S309: The transmit end acquires communications data to be transmitted to the at least two receive ends and the identifiers of the at least two receive ends.

S310: The transmit end sends the communications data and the identifiers of the at least two receive ends to the network side device.

S311: The network side device forwards the communications data to the receive ends that correspond to the identifiers of the at least two receive ends.

In the multiparty call method provided in this embodiment of the present disclosure, the network side device is introduced between the transmit end and the at least two receive ends that participate in a multiparty call, and a wireless connection is established between the network side device and the transmit end.

For example, when the transmit end makes a multiparty call with the at least two receive ends, the transmit end needs to first send the multiparty call request to the network side device, to detect whether the network side device supports the multiparty call request. After the transmit end determines that the network side device supports the multiparty call request, subsequent steps are further performed.

A process in which the transmit end sends the multiparty call request to the network side device includes a detection process and a negotiation process between the transmit end and the network side device. The detection process is used by the network side device to detect, according to information in a packet sent by the transmit end to the network side device, whether the network side device supports the multiparty call. The negotiation process is used by the network side device to acquire, according to the information in the packet sent by the transmit end, an identifier of the transmit end that initiates the multiparty call and the identifiers of the at least two receive ends that participate in the multiparty call.

It should be noted that, in the detection process and the negotiation process, the packet sent by the transmit end to the network side device may be one packet that includes information required in the detection process and the negotiation process, or may be two different packets that respectively include information required in the detection process and information required in the negotiation process.

For example, in the detection process and the negotiation process, the packet sent by the transmit end to the network side device may be one packet, or may be two different packets. Therefore, cases in which the transmit end sends a packet to the network side device in the detection process and the negotiation process may be separately described in this embodiment of the present disclosure using the following examples:

(1) The transmit end sends one packet to the network side device, for the detection process and the negotiation process between the transmit end and the network side device.

The packet carries a multiparty call service identifier and the identifiers of the at least two receive ends, and the network side device may determine, according to the multiparty call service identifier, that the transmit end initiates a multiparty call.

In one embodiment, after the transmit end initiates the multiparty call, in the detection process and the negotiation process completed between the transmit end and the network side device, search and detection may be completed using a quality of service (QoS) mechanism in the 3G protocol, or detection may also be completed using a QoS mechanism in the Wi-Fi protocol in order to improve detection efficiency.

Exemplarily, if a 3G connection is used between the transmit end and the network side device, the QoS mechanism in the 3G protocol is used in the detection process and the negotiation process completed between the transmit end and the network side device, and a specific format of the packet is shown in Table 1.

TABLE 1

| | |
|---|---|
| Quality of Service IEI | Octet 1 |
| Some QoS parameters defined in the original 3GPP | Octets 2-18 |
| Whether the feature, a source port number, and quantities of target IP addresses and target port numbers are supported | Octet 19 |
| IP Address | Octets 20-25 |
| Port | Octets 26-27 |
| ... | |

Octet 1 and Octets 2-18 are parameters in the QoS mechanism, a bit in Octet 19 indicates whether the network side device supports the feature, the source port number, and the quantities of target IP addresses and target port numbers, Octets 20-25 represents one target IP address, and Octets 26-27 represents one target port number, and the others identify the remaining target IP addresses and target port numbers, where the target IP address and the target port number are an IP address of the receive end and a port number of the receive end that are described in this embodiment of the present disclosure.

Correspondingly, after the transmit end sends the multiparty call request to the network side device, the network side device receives the multiparty call request. The network side device may learn, according to Octet 19, Octets 20-25, and other bits that represent the IP address and the port number of the receive end in the packet including the multiparty call request, that the transmit end initiates the multiparty call, and learns IP addresses and port numbers of the transmit end and the at least two receive ends.

(2) The transmit end sends two different packets to the network side device, respectively for the detection process and the negotiation process between the transmit end and the network side device.

For example, the detection process between the transmit end and the network side device is first completed. The transmit end sends a request packet for the detection process to the network side device, where the packet carries a multiparty call service identifier such that the network side device determines, according to the multiparty call service identifier, that the transmit end initiates the multiparty call.

Exemplarily, a format of the request packet, sent by the transmit end to the network side device, for the detection process is shown in Table 2.

TABLE 2

| Message type | Request | Retention |
|---|---|---|

Corresponding fields are occupied by the message type, the request, and the retention. After receiving the packet, the network side device learns, according to the fields carried and stored in the packet, that the transmit end initiates the multiparty call.

If the network side device supports the multiparty call, the negotiation process between the transmit end and the network side device is completed. The transmit end sends a request packet for the negotiation process to the network side device, where the packet carries an IP address and a port number of the transmit end, and IP addresses and port numbers of the at least two receive ends such that network side device learns identifiers of the transmit end and the at least two receive ends.

Exemplarily, a format of the request packet, sent by the transmit end to the network side device, for the negotiation process is shown in Table 3.

TABLE 3

| Message type | Request | Address type | Operation (add, delete, or the like) | Address usage | Address information/ Unique identifier |
|---|---|---|---|---|---|

Corresponding fields are occupied by the message type, the request, the address type, the operation, the address usage, and the address information. After receiving the packet, the network side device learns address information/ unique identifiers of the transmit end and the at least two receive ends according to the fields carried and stored in the packet, where the identifier includes at least an IP address and a port number.

It should be noted that, the identifiers of the transmit end and the at least two receive ends may be other special identifiers, where the special identifier can be identified by the network side device. For example, a header of the request packet may be a special header, and the special header can be identified by the network side device.

Exemplarily, the transmit end in this embodiment of the present disclosure may be an electronic device that establishes a wireless connection to the network side device, for example, an electronic device such as a personal computer, an iPad, or a smart phone, and the network side device may be a wireless router or a network side device based on a 3G mobile communications technology, which are not limited in this embodiment of the present disclosure.

After receiving the multiparty call request sent by the transmit end, the network side device performs corresponding processing according to the information carried in the packet of the multiparty call request, and then, sends the response message to the transmit end.

Because the process in which the transmit end sends the multiparty call request to the network side device includes the detection process and the negotiation process between the transmit end and the network side device, after receiving the multiparty call request sent by the transmit end, the network side device completes the detection process and the negotiation process according to the information carried in the packet including the multiparty call request.

It should be noted that, in the detection process and the negotiation process that are performed by the network side device, regardless of whether one packet or two different packets are sent by the transmit end to the network side device, the network side device needs to send the first response message to the transmit end. The first response message includes a feedback message and an acknowledgment message, where the feedback message is used to indicate to the transmit end that the network side device supports the multiparty call, and the acknowledgment message is used to indicate to the transmit end that the network side device already obtains a unique identifier of the transmit end and the identifiers of the at least two receive ends.

For example, during a process in which the network side device and the transmit end complete the detection process, the network side device detects whether the network side device supports the multiparty call, and after determining that the multiparty call is supported, the network side device sends the feedback message to the transmit end according to the multiparty call request sent by the transmit end to the network side device. The feedback message is used to indicate to the transmit end that the network side device supports the multiparty call such that the transmit end further sends data or a request to the network side device.

Exemplarily, a format of a packet of the feedback message sent by the network side device to the transmit end is shown in Table 4.

TABLE 4

| Message type | Response | Search result |
|---|---|---|

Corresponding fields are occupied by the message type, the response, and the search result. In the feedback message, the search result field of the packet indicates that the multiparty call is supported.

If the network side device does not support the multiparty call, the network side device sends, to the transmit end, a feedback message indicating that the multiparty call is not supported in order to indicate to the transmit end that the network side device does not support the multiparty call such that the transmit end sends no multiparty call request to the network side device any longer.

Correspondingly, if the network side device supports the multiparty call request, the transmit end can receive the feedback message that corresponds to the multiparty call request and that is sent by the network side device to the transmit end, where the feedback message is used to indicate to the transmit end that the network side device supports the multiparty call, in this way, the transmit end may further send data or another request to the network side device.

Further, in the negotiation process performed by the network side device and the transmit end, after acquiring the unique identifier of the transmit end that initiates the multiparty call, and the identifiers of the at least two receive ends, the network side device sends the acknowledgment message to the transmit end, where the acknowledgment message is used to indicate to the transmit end that the network side device already acquires the unique identifier of the transmit end and the identifiers of the at least two receive ends.

Exemplarily, a format of a packet of the acknowledgment message sent by the network side device to the transmit end is shown in Table 5.

TABLE 5

| Message type | Response | Address type | Address usage | Processing result/unique identifier |
|---|---|---|---|---|

Corresponding fields are occupied by the message type, the response, the address type, the address usage, and the processing result. The network side device sends the packet to the transmit end, where the packet carries information that the network side already learns the identifiers of the transmit end and the at least two receive ends.

Correspondingly, if the network side device already obtains the identifiers of the transmit end and the at least two receive ends, the transmit end can receive the acknowledgment message that corresponds to the multiparty call request and that is sent by the network side device to the transmit end, where the acknowledgment message is used to indicate to the transmit end that the network side device already obtains the unique identifier of the transmit end and the identifiers of the at least two receive ends.

For example, after the transmit end receives the first response message that corresponds to the multiparty call request and that is sent by the network side device, the transmit end learns that the network side device supports the multiparty call and that the network side device already obtains the unique identifier of the transmit end and the identifiers of the at least two receive ends. Then, the transmit end sends the link establishment request that includes the identifiers of the at least two receive ends to the network side device such that the network side device connects links between the network side device and the at least two receive ends according to the link establishment request.

Exemplarily, a format of a packet of the link establishment request sent by the transmit end to the network side device is shown in Table 6.

TABLE 6

| Message type | Request | Operation type | Unique identifier |
|---|---|---|---|

Corresponding fields are occupied by the message type, the request, the operation type, and the unique identifier. The packet of the link establishment request sent by the transmit end to the network side carries a field for establishing a connection separately to the at least two receive ends.

Correspondingly, after receiving the packet of the link establishment request, the network side device establishes a link connection according to information carried in the packet.

Further, when the multiparty call ends, the transmit end sends a link disconnection request that includes the identifiers of the at least two receive ends to the network side device, and after receiving the link disconnection request, the network side device disconnects the links between the network side device and the at least two receive ends according to the link disconnection request.

A format of a packet of the link disconnection request sent by the transmit end to the network side device is shown in Table 6. It should be noted that a field type in the packet of the link disconnection request and that in the packet of the link establishment request are consistent, but specific field content is different.

After receiving the link establishment request sent by the transmit end, the network side device establishes a link connection separately to the at least two receive ends according to the information carried in the packet of the link establishment request such that the transmit end can successfully send data to the at least two receive ends.

After receiving the link establishment request sent by the transmit end, and establishing the link connection separately to the at least two receive ends according to the link establishment request, the network side device sends the second response message to the transmit end.

For example, after receiving the link establishment request sent by the transmit end, and establishing the link connection separately to the at least two receive ends according to the identifiers of the at least two receive ends, the network side device sends the second response message that corresponds to the link establishment request to the transmit end such that if the network side device receives communications data that needs to be transmitted to the at least two receive ends and that is from the transmit end, the network side device forwards the data to the at least two receive ends according to the identifiers of the at least two receive ends. The identifier of the receive end includes at least an IP address and a port number.

Exemplarily, a format of a packet of the second response message sent by the network side device to the transmit end is shown in Table 7.

TABLE 7

| Message type | Response | Operation type | Success or not |
|---|---|---|---|

Corresponding fields are occupied by the message type, the response, the operation type, and the success or not. The network side device stores, in the success or not field, a connection result(s) of the links between the at least two receive ends and the network side device, and after receiving the packet, the transmit end learns, according to information stored in the success or not field of the packet, whether the network side device successfully connects links between the at least two receive ends and the network side device.

For example, if the transmit end sends the link disconnection request to the network side device, the network side device disconnects the links between the network side device and the at least two receive ends according to the identifiers of the at least two receive ends.

Further, after disconnecting the links between the network side device and the at least two receive ends, the network side device also sends, to the transmit end, the second response message indicating the disconnection, where the second response message indicating the disconnection is used to indicate to the transmit end that the network side device already disconnects the link connection separately to the at least two receive ends. A format of a packet thereof is shown in Table 7. The network side device stores, in the success or not field, a disconnection result(s) of the links between the at least two receive ends and the network side device, After receiving the packet, the transmit end learns, according to information stored in the success or not field of the packet, whether the network side device successfully disconnects the links between the at least two receive ends and the network side device.

After receiving the second response message that is sent by the network side device and that indicates that the links between the at least two receive ends and the network side device are successfully connected, the transmit end learns that the connections between the network side device and the at least two receive ends is already established, and needs to further verify whether links between the transmit end and the at least two receive ends are connected.

Because a link between the transmit end and the network side device is already connected, connectivity of only the links between the network side device and the at least two receive ends needs to be verified.

For example, the transmit end sends the link connectivity detection request to the network side device such that the network side device detects the connectivity of the links between the network side device and the at least two receive ends.

It should be noted that, when a network address translation (NAT) traversal scenario exists, it is necessary for the transmit end to send the link connectivity detection request to the network side device.

NAT is a conversion technology used to convert a private (reserved) address to a legal IP address, and is widely applied in various types of Internet access manners and various types of networks. The NAT not only perfectly overcomes a defect in the IP address, but also can efficiently avoid an attack outside a network, and hide and protect a computer inside the network.

Correspondingly, the network side device can receive the link connectivity detection request from the transmit end.

After receiving the link connectivity detection request sent by the transmit end, the network side device detects, according to the IP addresses and the port numbers of the at least two receive ends, whether the links between the network side device and the at least two receive ends are already connected.

It should be noted that, in the NAT traversal scenario, after receiving the link connectivity detection request, the network side device detects whether links between the network side device and at least two receive ends having private addresses are already connected.

The third response message is used to indicate to the transmit end that the links between the network side device and the at least two receive ends are already connected.

After the network side device receives the link connectivity detection request sent by the transmit end, the network side device performs detection according to the request, and needs to send the corresponding response message to the transmit end after the connectivity of the links between the network side device and the at least two receive ends is detected.

For example, if the network side device detects that the links between the network side device and the at least two receive ends are already connected, the network side device sends the third response message that corresponds to the link connectivity detection request to the transmit end, where the third response message is used to indicate to the transmit end that the links between the network side device and the at least two receive ends are already connected. In this way, the data sent by the transmit end may be accurately sent to the at least two receive ends using the network side device.

Exemplarily, a format of a packet of the third response message sent by the network side device to the transmit end is shown in Table 8.

TABLE 8

| Message type | Response | Operation type | Connectivity detection result information |
| --- | --- | --- | --- |

Corresponding fields are occupied by the message type, the response, the operation type, and the connectivity detection result information. The network side device stores, in the connectivity detection result information field, a connectivity detection result(s) of the links between the at least two receive ends and the network side device.

Correspondingly, if the links between the network side device and the at least two receive ends are already connected, the transmit end receives the third response message that corresponds to the link connectivity detection request and that is sent by the network side device. After receiving the packet of the third response message, the transmit end learns, according to information stored in the connectivity detection result information field of the packet, whether the links, detected by the network side device, between the at least two receive ends and the network side device are connected.

Likewise, if the network side device detects that the links between the network side device and the at least two receive ends are not connected, the network side device sends a fourth response message that corresponds to the link connectivity detection request to the transmit end.

The fourth response message is used to indicate to the transmit end that the links between the network side device and the at least two receive ends are not connected. Therefore, the data sent by the transmit end cannot be accurately sent to the receive ends using the network side device.

Correspondingly, if the links between the network side device and the at least two receive ends are not connected, the transmit end receives the fourth response message that corresponds to the link connectivity detection request and that is sent by the network side device, and learns, according to the fourth response message, that the data cannot be accurately sent to the at least two receive ends using the network side device.

For example, when the transmit end makes a multiparty call with the at least two receive ends, and the links between the transmit end and the at least two receive ends are already connected, the transmit end first acquires the communications data to be transmitted to the at least two receive ends and the identifiers of the at least two receive ends in order to transmit the to-be-transmitted data to the at least two receive ends.

The transmit end acquires only one piece of communications data to be transmitted to the at least two receive ends, the identifier of the receive end is used to indicate a specific position of the receive end, and each receive end has a unique identifier. The identifier of the receive end includes at least the IP address and the port number of the receive end.

For example, a multiparty voice call is made among mobile phone users A, B, and C. When the user A wants to send voice data to the users B and C, a mobile phone of the user A needs to first acquire the to-be-sent voice data, an identifier of a mobile phone of the user B, and an identifier of a mobile phone of the user C.

For example, the transmit end needs to collect only one piece of communications data and send the communications data to the network side device, and sends the identifiers of the at least two receive ends to the network side device. Then the network side device forwards the communications data to the at least two receive ends according to the identifiers of the receive ends.

This embodiment of the present disclosure provides a multiparty call method. A network side device receives communications data to be transmitted to at least two receive ends and identifiers of the at least two receive ends that are sent by the transmit end, and then, the network side device forwards the communications data to the receive ends that correspond to the identifiers of the at least two receive ends. Using the solution, the transmit end sends the communications data and the identifiers of the at least two receive ends to the network side device such that the network side device forwards the communications data to the receive ends that correspond to the identifiers of the at least two receive ends, which completes a multiparty call between the transmit end and the at least two receive ends, resolves a problem that the transmit end needs to send same communications data to the receive ends, and ensures that only one piece of data is transferred over an air interface, thereby saving an air interface resource, and reducing a network delay.

Embodiment 4

A transmit end described in this embodiment of the present disclosure may be a user terminal, or may be another terminal that can be used for information transmission, which is not limited in the present disclosure. This embodiment of the present disclosure is described using an example in which the transmit end is user equipment. The user equipment provided in this embodiment of the present disclosure is configured to implement the methods provided in the foregoing embodiments.

Figure 4:
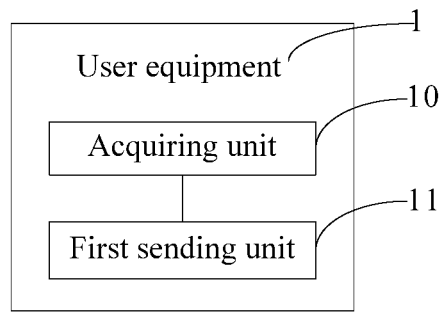
FIG. 4 is schematic structural diagram 1 of user equipment according to an embodiment of the present disclosure.

This embodiment of the present disclosure provides user equipment 1, which, as shown in FIG. 4, includes an acquiring unit 10 configured to acquire communications data to be transmitted to at least two receive ends and identifiers of the at least two receive ends, and a first sending unit 11 configured to send the communications data and the identifiers of the at least two receive ends that are acquired by the acquiring unit 10 to a network side device such that the network side device forwards the communications data to the receive ends that correspond to the identifiers of the at least two receive ends.

Further, before sending the communications data and the identifiers of the at least two receive ends to the network side device, the first sending unit 11 is further configured to send a multiparty call request to the network side device, and is configured to send a link establishment request that includes the identifiers of the at least two receive ends to the network side device such that the network side device establishes a link connection separately to the at least two receive ends.

Figure 5:
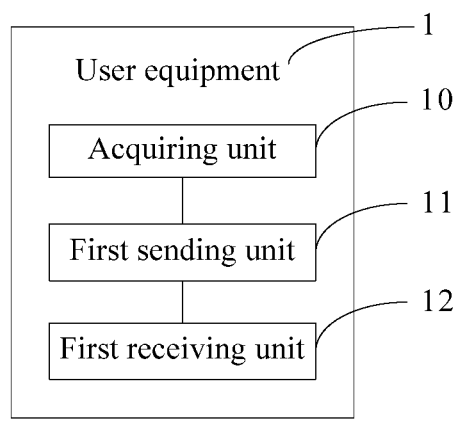
FIG. 5 is schematic structural diagram 2 of user equipment according to an embodiment of the present disclosure.

As shown in FIG. 5, the user equipment 1 further includes a first receiving unit 12. The first receiving unit 12 is configured to, if the network side device supports a multiparty call, receive a first response message that corresponds to the multiparty call request and that is sent by the network side device, where the first response message is used to indicate to the user equipment 1 that the network side device supports the multiparty call and that the network side device already acquires an identifier of the user equipment and the identifiers of the at least two receive ends. Further, the identifier of the receive end includes at least an IP address and a port number of the receive end.

This embodiment of the present disclosure provides user equipment, which mainly includes an acquiring unit and a first sending unit. The acquiring unit acquires communications data to be transmitted to at least two receive ends and identifiers of the at least two receive ends, and then, the first sending unit sends the communications data and the identifiers of the at least two receive ends to a network side device such that the network side device forwards the communications data to the receive ends that correspond to the identifiers of the at least two receive ends. Using the solution, the user equipment sends the communications data and the identifiers of the at least two receive ends to the network side device such that the network side device forwards the communications data to the receive ends that correspond to the identifiers of the at least two receive ends. This implements a multiparty call between the user equipment and the at least two receive ends, resolves a problem that user equipment needs to send same communications data to receive ends, and ensures that only one piece of data is transferred over an air interface, thereby saving an air interface resource, and reducing a network delay.

Embodiment 5

Figure 6:
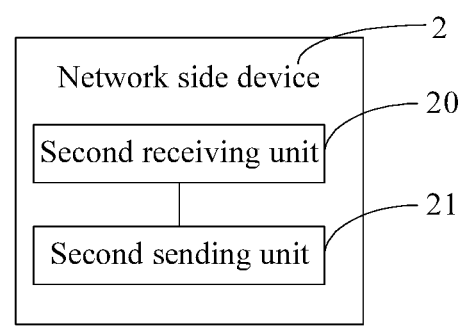
FIG. 6 is schematic structural diagram 1 of a network side device according to an embodiment of the present disclosure.

This embodiment of the present disclosure provides a network side device 2, and the network side device 2 provided in this embodiment of the present disclosure is configured to implement the methods provided in the foregoing embodiments. As shown in FIG. 6, the network side device 2 includes a second receiving unit 20 configured to receive communications data to be transmitted to at least two receive ends and identifiers of the at least two receive ends that are sent by the transmit end, and a second sending unit 21 configured to forward the communications data to the at least two receive ends according to the identifiers of the at least two receive ends that are received by the second receiving unit 20.

Further, before receiving the communications data to be transmitted to the at least two receive ends and the identifiers of the at least two receive ends that are sent by the transmit end, the second receiving unit 20 is further configured to receive a multiparty call request sent by the transmit end, and is configured to receive a link establishment request that includes the identifiers of the at least two receive ends and that is sent by the transmit end.

The second sending unit 21 is further configured to, if the network side device supports a multiparty call, send a first response message that corresponds to the multiparty call request to the transmit end, where the first response message is used to indicate to the transmit end that the network side device supports the multiparty call.

Figure 7:
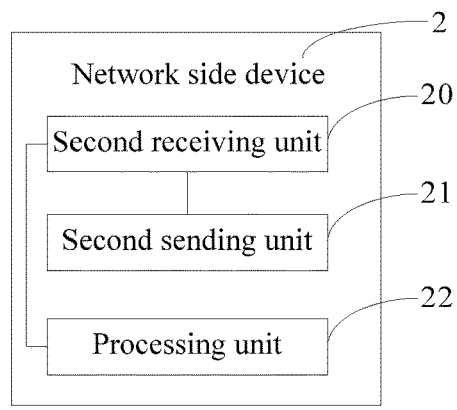
FIG. 7 is schematic structural diagram 2 of a network side device according to an embodiment of the present disclosure.

As shown in FIG. 7, the network side device 2 further includes a processing unit 22. The processing unit 22 is configured to establish a link connection separately to the at least two receive ends according to the link establishment request received by the second receiving unit 20. Further, the identifier of the receive end includes at least an IP address and a port number of the receive end. Further, the network side device may be a wireless router or a network side device based on a 3G mobile communications technology.

This embodiment of the present disclosure provides a network side device, which mainly includes a second receiving unit and a second sending unit. The second receiving unit receives communications data to be transmitted to at least two receive ends and identifiers of the at least two receive ends that are sent by a transmit end, and then, the second sending unit forwards the communications data to the receive ends that correspond to the identifiers of the at least two receive ends. Using the solution, the transmit end sends the communications data and the identifiers of the at least two receive ends to the network side device such that the network side device forwards the communications data to the receive ends that correspond to the identifiers of the at least two receive ends, which completes a multiparty call between the transmit end and the at least two receive ends, resolves a problem that the transmit end needs to send same communications data to the receive ends, and ensures that only one piece of data is transferred over an air interface, thereby saving an air interface resource, and reducing a network delay.

Embodiment 6

A transmit end described in this embodiment of the present disclosure may be a user terminal, or may be another terminal that can be used for information transmission, which is not limited in the present disclosure. This embodiment of the present disclosure is described using an example in which the transmit end is user equipment.

Figure 8:
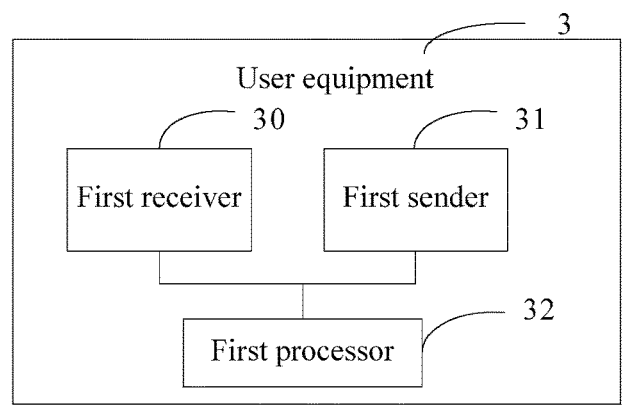
FIG. 8 is schematic structural diagram 3 of user equipment according to an embodiment of the present disclosure.

This embodiment of the present disclosure provides user equipment 3, and the user equipment 3 provided in this embodiment of the present disclosure is configured to implement the methods provided in the foregoing embodiments. As shown in FIG. 8, the user equipment 3 includes a first receiver 30 configured to receive data from the outside, a first sender 31 configured to send data to the outside, and a first processor 32 configured to acquire communications data to be transmitted to at least two receive ends and identifiers of the at least two receive ends, and further configured to send, using the first sender 31, the communications data and the identifiers of the at least two receive ends to a network side device such that the network side device forwards the communications data to the receive ends that correspond to the identifiers of the at least two receive ends.

Further, before sending the communications data and the identifiers of the at least two receive ends to the network side device, the first processor 32 is further configured to send a multiparty call request to the network side device using the first sender 31, and is configured to send a link establishment request that includes the identifiers of the at least two receive ends to the network side device such that the network side device establishes a link connection separately to the at least two receive ends.

The first processor 32 is further configured to if the network side device supports a multiparty call, receive, using the first receiver 30, a first response message that corresponds to the multiparty call request and that is sent by the network side device, where the first response message is used to indicate to the user equipment 3 that the network side device supports the multiparty call and that the network side device already acquires an identifier of the user equipment and the identifiers of the at least two receive ends.

Further, the identifier of the receive end includes at least an IP address and a port number of the receive end.

This embodiment of the present disclosure provides user equipment, which mainly includes a first receiver, a first sender, and a first processor. The first processor acquires communications data to be transmitted to at least two receive ends and identifiers of the at least two receive ends, and then, sends, using the first sender, the communications data and the identifiers of the at least two receive ends to a network side device such that the network side device forwards the communications data to the receive ends that correspond to the identifiers of the at least two receive ends. Using the solution, the user equipment sends the communications data and the identifiers of the at least two receive ends to the network side device such that the network side device forwards the communications data to the receive ends that correspond to the identifiers of the at least two receive ends. This implements a multiparty call between the user equipment and the at least two receive ends, resolves a problem that user equipment needs to send same communications data to receive ends, and ensures that only one piece of data is transferred over an air interface, thereby saving an air interface resource, and reducing a network delay.

Embodiment 7

Figure 9:
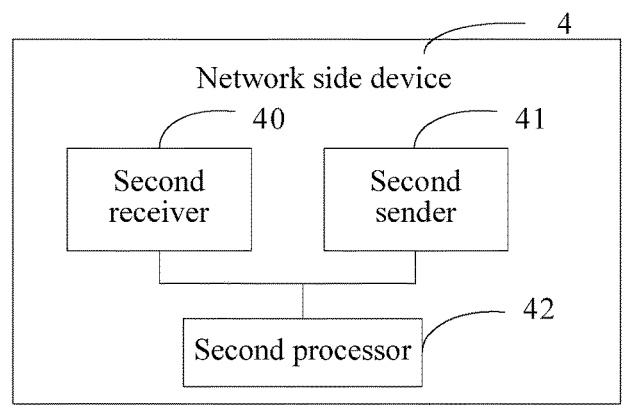
FIG. 9 is schematic structural diagram 3 of a network side device according to an embodiment of the present disclosure.

This embodiment of the present disclosure provides a network side device 4, and the network side device provided in this embodiment of the present disclosure is configured to implement the methods provided in the foregoing embodiments. As shown in FIG. 9, the network side device 4 includes a second receiver 40 configured to receive data from the outside, a second sender 41 configured to send data to the outside, and a second processor 42 configured to receive, using the second receiver 40, communications data to be transmitted to at least two receive ends and identifiers of the at least two receive ends that are sent by a transmit end, and further configured to forward, using the second sender 41, the communications data to the at least two receive ends according to the identifiers of the at least two receive ends that are received by the second receiver 40.

Further, before receiving the communications data to be transmitted to the at least two receive ends and the identifiers of the at least two receive ends that are sent by the transmit end, the second processor 42 is further configured to receive, using the second receiver 40, a multiparty call request sent by the transmit end, and receive a link establishment request that includes the identifiers of the at least two receive ends and that is sent by the transmit end.

The second processor 42 is further configured to if the network side device supports a multiparty call, send, using the second sender 41, a first response message that corresponds to the multiparty call request to the transmit end, where the first response message is used to indicate to the transmit end that the network side device supports the multiparty call.

Further, the second processor 42 is further configured to establish a link connection separately to the at least two receive ends according to the received link establishment request. Further, the identifier of the receive end includes at least an IP address and a port number of the receive end. Further, the network side device may be a wireless router or a network side device based on a 3G mobile communications technology.

This embodiment of the present disclosure provides a network side device, which mainly includes a second receiver, a second sender, and a second processor. The second processor acquires, using the second receiver, communications data to be transmitted to at least two receive ends and identifiers of the at least two receive ends, then, the second processor forwards, using the second sender, the communications data to the receive ends that correspond to the identifiers of the at least two receive ends. Using the solution, a transmit end sends the communications data and the identifiers of the at least two receive ends to the network side device such that the network side device forwards the communications data to the receive ends that correspond to the identifiers of the at least two receive ends, which completes a multiparty call between the transmit end and the at least two receive ends, resolves a problem that the transmit end needs to send same communications data to the receive ends, and ensures that only one piece of data is transferred over an air interface, thereby saving an air interface resource, and reducing a network delay.

It may be clearly understood by a person skilled in the art that, for the purpose of convenient and brief description, division of the foregoing functional modules is taken as an example for illustration. In actual application, the foregoing functions can be allocated to different functional modules and implemented according to a requirement, that is, an inner structure of an apparatus is divided into different functional modules to implement all or some of the functions described above. For a detailed working process of the foregoing system, apparatus, and unit, reference may be made to a corresponding process in the foregoing method embodiments, and details are not described herein again.

A person of ordinary skill in the art may understand that all or some of the steps of the method embodiments may be implemented by a program instructing relevant hardware. The program may be stored in a computer-readable storage medium. When the program runs, the steps of the method embodiments are performed. The foregoing storage medium includes any medium that can store program code, such as a read-only memory (ROM), a random access memory (RAM), a magnetic disk, or an optical disc. The foregoing descriptions are merely specific implementation manners of the present disclosure, but are not intended to limit the protection scope of the present disclosure. Any variation or replacement readily figured out by a person skilled in the art within the technical scope disclosed in the present disclosure shall fall within the protection scope of the present disclosure. Therefore, the protection scope of the present disclosure shall be subject to the protection scope of the claims.

What is claimed is:

1. A multiparty call method, applied in a process in which a transmit end makes a multiparty call with at least two receive ends, wherein the transmit end and the at least two receive ends are user equipment, wherein the method comprises:
    acquiring, by the transmit end, one piece of communications data to be transmitted to the at least two receive ends and identifiers of each of the at least two receive ends, wherein the identifiers of each of the at least two receive ends comprise internet protocol (IP) addresses of the at least two receive ends and port numbers for the at least two receive ends: and
    sending, by the transmit end, the one piece of communications data and the identifiers of each of the at least two receive ends to a network side device.

2. The multiparty call method according to claim 1, wherein before the sending, by the transmit end, the one piece of communications data and the identifiers of each of the at least two receive ends to a network side device, the method further comprises:
    sending, by the transmit end, a multiparty call request to the network side device;
    receiving, by the transmit end, a first response message that corresponds to the multiparty call request from the network side device when the network side device supports the multiparty call, wherein the first response message is used to indicate to the transmit end that the network side device supports the multiparty call and that the network side device has acquired an identifier of the transmit end and the identifiers of the at least two receive ends; and
    sending, by the transmit end, a link establishment request that comprises the identifiers of the at least two receive ends to the network side device.

3. The multiparty call method according to claim 2, further comprising sending, by the transmit end, a link disconnection request to the network side device.

4. The multiparty call method according to claim 3, wherein a packet format of the link establishment request is the same as a packet format of the link disconnection request.

5. A multiparty call method, applied in a process in which a transmit end makes a multiparty call with at least two receive ends, wherein the transmit end and the at least two receive ends are user equipment, and wherein the method comprises:
    receiving, by a network side device, one piece of communications data to be transmitted to each of the at least two receive ends and identifiers of the at least two receive ends from the transmit end, wherein the identifiers of each of the at least two receive ends comprise internet protocol (IP) addresses of the at least two receive ends and port numbers for the at least two receive ends; and
    forwarding, by the network side device, the one piece of communications data to each of the at least two receive ends according to the identifiers of the at least two receive ends.

6. The multiparty call method according to claim 5, wherein before the receiving, by the network side device, the one piece of communications data to be transmitted to each of the at least two receive ends and identifiers of the at least two receive ends from the transmit end, the method further comprises:
    receiving, by the network side device, a multiparty call request sent by the transmit end;
    sending, by the network side device, a first response message that corresponds to the multiparty call request to the transmit end when the network side device supports the multiparty call, wherein the first response message is used to indicate to the transmit end that the network side device supports the multiparty call and that the network side device has acquired an identifier of the transmit end and the identifiers of the at least two receive ends;
    receiving, by the network side device, a link establishment request that comprises the identifiers of the at least two receive ends; and
    establishing, by the network side device, a link connection separately to the at least two receive ends according to the link establishment request.

7. The multiparty call method according to claim 6, further comprising receiving a link disconnection request from the transmit end.

8. The multiparty call method according to claim 7, wherein a packet format of the link establishment request is the same as a packet format of the link disconnection request.

9. The multiparty call method according to claim 7, further comprising disconnecting each link connection between the transmit end and the at least two receive end responsive to receiving the link disconnection request.

10. The multiparty call method according to claim 5, wherein the network side device is a wireless router.

11. The multiparty call method according to claim 5, wherein the network side device is a gateway.

12. The multiparty call method according to claim 5, wherein the network side device is a mobility management entity based on a 3G mobile communications technology.

13. A user equipment configured to make a multiparty call with at least two receive ends, the user equipment comprising:
    a receiver configured to receive data;
    a transmitter configured to send data; and
    a processor coupled to the receiver and the transmitter configured to acquire one piece of communications data to be transmitted to the at least two receive ends and identifiers of each of the at least two receive ends, wherein the transmitter is further configured to send the one piece of communications data and the identifiers of each of the at least two receive ends to a network side device.

14. The user equipment according to claim 13, wherein before sending the one piece of communications data and the identifiers of each of the at least two receive ends to the network side device, the transmitter is further configured to send a multiparty call request to the network side device and the receiver is further configured to receive, from the network side device, a first response message that corresponds to the multiparty call request when the network side device supports the multiparty call, wherein the first response message indicates to the user equipment that the network side device supports the multiparty call and that the network side device has acquired an identifier of the user equipment and the identifiers of the at least two receive ends, and wherein the transmitter is further configured to send a link establishment request that comprises the identifiers of the at least two receive ends to the network side device.

15. The user equipment of claim 14, wherein the transmitter is further configured to send a link disconnection request to the network side device.

16. The user equipment according to claim 15, wherein a packet format of the link establishment request is the same as a packet format of the link disconnection request.

* * * * *